Nov. 18, 1924.  1,515,848

G. F. ECKART

SKID PREVENTING MEANS FOR VEHICLE TIRES

Filed Sept. 29, 1921   2 Sheets-Sheet 1

Inventor:
George F. Eckart
By
Attorney

Nov. 18, 1924.  1,515,848
G. F. ECKART
SKID PREVENTING MEANS FOR VEHICLE TIRES
Filed Sept. 29, 1921  2 Sheets-Sheet 2
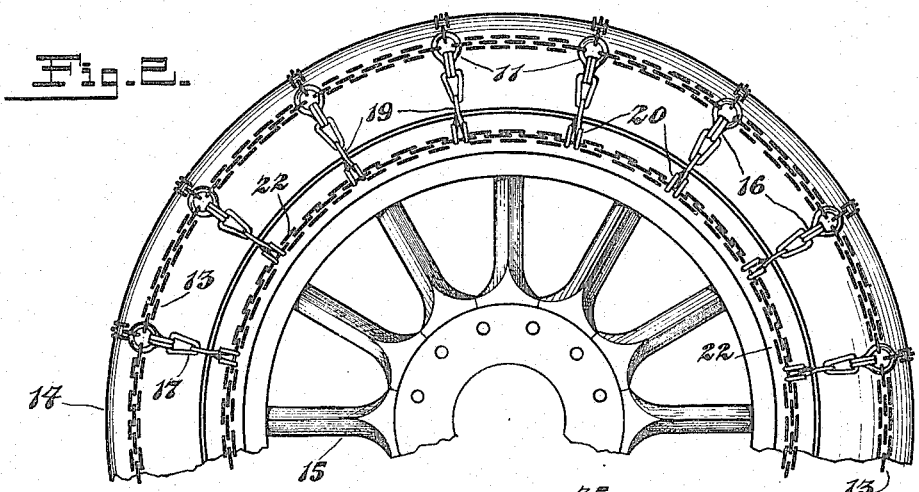
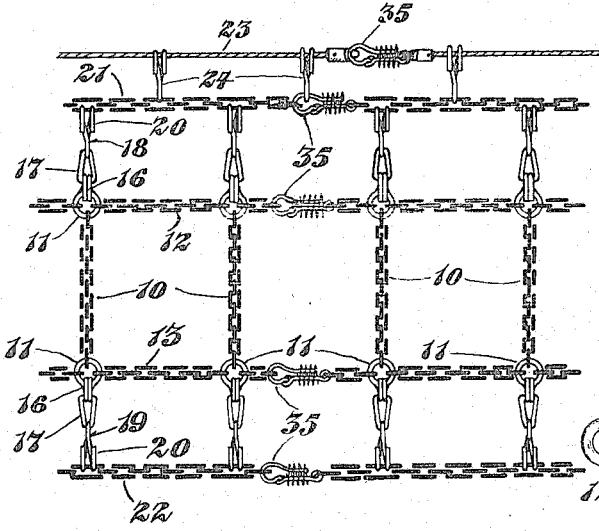
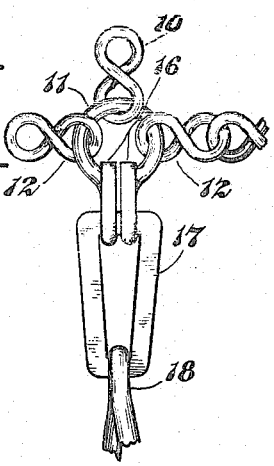
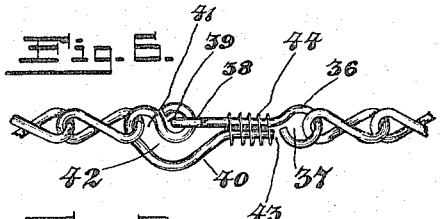
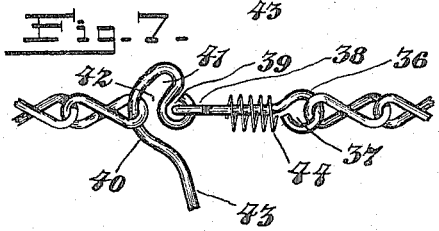
INVENTOR:
George F. Eckart
By
ATTORNEY.

Patented Nov. 18, 1924.

1,515,848

UNITED STATES PATENT OFFICE.

GEORGE F. ECKART, OF CINCINNATI, OHIO, ASSIGNOR OF SEVENTY PER CENT TO DAVID B. STRICKLING, OF CINCINNATI, OHIO.

SKID-PREVENTING MEANS FOR VEHICLE TIRES.

Application filed September 29, 1921. Serial No. 504,018.

*To all whom it may concern:*

Be it known that I, GEORGE F. ECKART, a citizen of the United States, residing at Cincinnati, in the county of Hamilton and State of Ohio, have invented certain new and useful Improvements in Skid-Preventing Means for Vehicle Tires, of which the following is a specification.

My invention relates to skid preventing means for rubber tired wheels of motor propelled vehicles.

I am aware that skid preventing means have been heretofore employed wherein a chain construction is detachably placed about the tires. However, certain objectionable features have been present in such devices, for instance, the breaking of the members in contact with the roadway and tread of the tires and their subsequent flying about and striking portions of the vehicles; further, the clasps whereby the device is attached have been extremely difficult of manipulation; further, the cross members of such chain devices have been subject to relative displacement easily becoming entangled with one another, and do not remain in the position about the tire in which they have been placed; and further, no means have been employed for maintaining an equal tension on all members of the device and capable of taking up wear in the chain.

The primary object of the present invention is to provide a detachable non-skidding attachment for vehicle wheels in which the members for preventing said skidding are maintained at all times in close engagement with the tire tread and the side portions thereof.

An additional object of my invention is to provide means, whereby when the tire is compressed the non-skidding members spanning the same may yield to move with the portion of the tire so compressed without varying the tension maintained on remaining members of said device.

My invention consists in the provision of a skid preventing device of which all portions thereof are entirely free of the felly or the spokes of the wheel; further, in means whereby when a portion of the tire in contact with the roadway is compressed, the anti-skid members located at such compressed portions may be permitted to yield without affecting the tension on the skid preventing members on the remaining portion of the tire; further, in means whereby spreading, turning and displacement of the members comprising the device are prevented; further, in new and novel clasp means whereby the several members of the device are retained about the wheel; and further, in adjustable and non-elastic tension maintaining means for holding the several members of the device in uniform tension about the wheel.

My invention further consists in the parts, combination, arrangement and construction of parts, and in the details of construction as herein set forth and claimed.

In the drawings:

Fig. 2 is a rear elevation of a portion of the same;

Fig. 4 is a view of the portion of my improved device laid out in plan Fig. 5 is an enlarged detail showing one of the novel features of my invention;

Fig. 6 is an enlarged detail in closed position showing the device for coupling the chain;

Fig. 7 is a view of the same in open position; and

Figure 1:
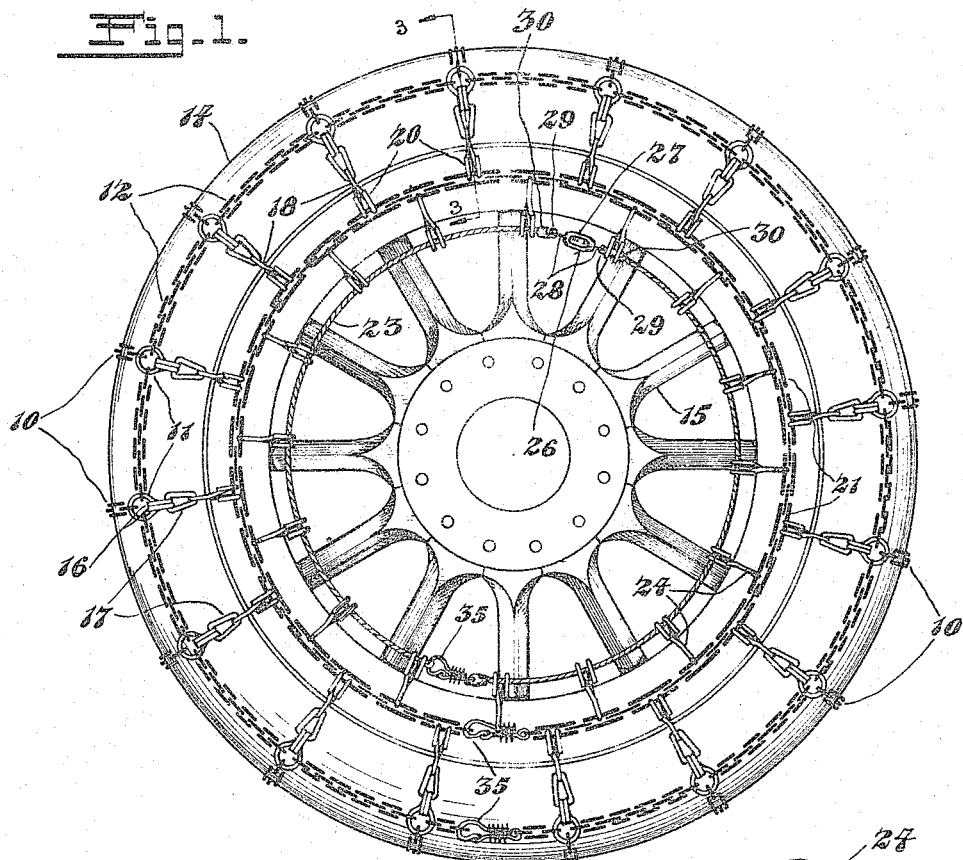
Fig. 1 is an outside elevation of a vehicle wheel having my improved device thereon.
Figure 8:
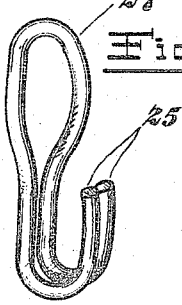
Fig. 8 is a perspective view of the hook link.
Figure 3:
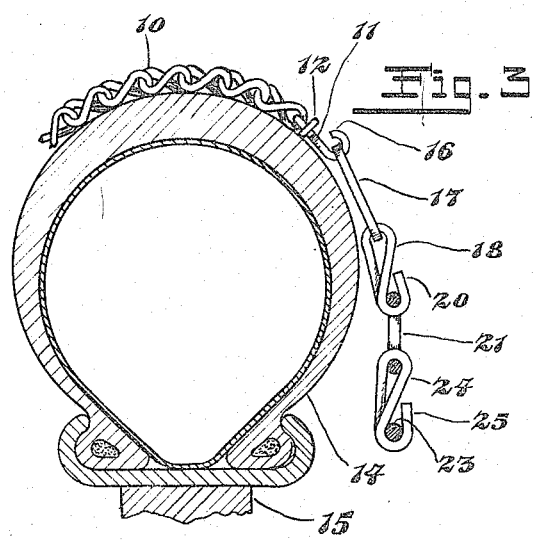
Fig. 3 is a partial vertical cross section of a vehicle wheel having my improved device thereon and taken on the line 3—3 of Fig. 1.

In the embodiment of my invention as illustrated and showing a prefererd form, skid preventing members 10 are joined by hook rings 11 to separable circular connecting members 12 and 13 disposed to either side of the tread of a tire 14, mounted on a suitable wheel 15. The members 10, 12 and 13 may consist of interconnected metal links or chain. However, any form of interconnected units may be employed as skid preventing members.

Each of the hook rings 11 is provided with a hook 16 adapted to engage one end of a triangular connector 17 which in turn is connected to separable limiting members 18 and 19 disposed to either side of the tire comprising preferably twist links received in the apexes of the triangular connectors, and each having hook portions 20 engaging circular connecting members 21 and 22 respectively.

In order to effectively hold the various members about the wheel with a uniform tension, a separable cable 23 is connected by means of hook rings 24 secured to circular connecting members 21 and 22 respectively. The cable 23 is carried in hooks 25 of the hook links 24, and has a turn buckle 26 therein.

This turn buckle comprises a rotatable member 27 having threaded connection with screw eyes 28 at its ends. The eyes of the screw eyes are engaged by hooks 29 of cable end pieces 30 in which the ends of the cable are secured.

The cable 23, connecting members 21 and 22, and circular connecting members 12 and 13, are provided with clasps 35 to permit the device to be readily attached to the wheel. This clasp comprises a link 36 having eyes 37 and 38, one of which is engaged by one end of the separable members the other eye engaging a closed eye 39 of a closure lever 40. This closure lever comprises an open eye 41 located adjacent the eye 39 which is engaged by the other end of the separable members. The eye 41 is extended to form a closure cam 42 which in turn has a locking shank 43 thereon. The locking shank 43 is adapted to be held in place against the link 36 by a collapsible coil spring 44 received about the link and the shank.

When it is desired to remove the device from the wheel, the spring is collapsed which permits the closure lever to open outwardly and thereby permit one end of the separable members to be released after which the device is easily detached.

In placing the device on the wheel, the clasps 35 of all the separable members are opened, the cable 23 being disengaged from the hooks 25 of the hook rings 24. The device is then placed about the wheel, the clasps 35 being readily closed by passing the free ends of the separable members over the closure levers 40. These levers are then closed which causes the separable members to be drawn together. The locking shank is then held in contact with the links 36 when the springs 44 are collapsed. Upon the springs being released, the same inclose both the links 36 and the locking shanks 43, which effectively hold them against unintentional release. The cable 23 is next inserted in the hooks 25 and its clasp locked in similar manner. The proper tension may now be imparted to the members of the device by adjusting the turn buckle 26.

It will be observed that as tension is imparted by the cable to the limiting member between the points at which the hooks 22 are secured, flattening out of the tread in contact with the roadway will not disturb the location and tension on such members as are not in contact therewith. A slack condition in any of the cross members is taken care of immediately at such points at which the slack occurs, without affecting in any manner or releasing the tension on other of the cross members.

My improved device is of extremely simplified construction, readily attached and efficient in its operation by reason of the readily operable clasps, attention afterwards being imparted to the entire device by the turn-buckle. Also no parts of my improved device are engaged with the felly or the spokes of the wheel, which feature avoids injury or scratching thereof.

The parts of the device which engage the roadway are all maintained relatively taut and held against movement relative to each other so that the throw of the parts during rapid motion of the wheel, and consequent digging or injury to the road are almost entirely obviated. By maintaining such equal tension on all of the members comprising my device rapid creeping of the chain about the tread of the wheel is almost entirely avoided, however, a slight creeping effect is of an advantage as the tire is not subject to such vigorous wear as when the chains are retained in one particular position on the tire.

What I claim as new and desire to secure by Letters Patent is:

1. In skid preventing means for vehicle tires, a pair of articulate normally endless members disposed on respectively opposite sides of said tire and of less diameter than the tread portion thereof, a second pair of articulate normally endless members disposed on respectively opposite sides of said tire and of less diameter than said first named endless members, articulate cross members disposed cross wise of said tire and having their ends secured respectively to each of said first named endless members, rings spaced apart and secured to said first named endless members in alignment with said cross members and having hooks thereon, connectors each having a tapering opening therein in the larger end of which said hooks are respectively received, a hook member received in the smallest end of each tapering opening and having connection with said second named endless members, attaching members on one of said second named endless members, a tension member, and means for contracting said tension member whereby the diameter thereof is adapted to be decreased to impart tension to said articulate members, and disjoining means for each of said endless members, substantially as set forth and for the purposes specified.

2. In skid preventing means for a vehicle tire, a pair of articulate normally endless members disposed on respectively opposite sides of said tire and of less diameter than the tread portion thereof, a second pair of articulate normally endless members disposed on respectively opposite sides of said tire and of less diameter than said first named endless members, articulate cross members disposed cross wise of said tire and having their ends secured respectively to each of said first named endless members, split rings each having spaced apart hooks thereon and secured to said first named endless members respectively in alignment with said cross members, connectors having triangular openings therein in the larger end of which said spaced apart hooks are respectively received, hook members received in the apex of said triangular openings respectively and having connection with said second named endless members, tension means for said members, and disjoining means for each of said endless members, substantially as set forth and for the purposes specified.

3. In skid preventing means for vehicle tires, a triangular closed connector link, a ring having hooks thereon adapted to engage the larger end of said triangular closed connector link and to engage the side walls of said opening whereby said hooks are prevented from shifting laterally therein, means for connecting the smaller end of said triangular closed connector link to a chain and said ring connected to a chain, substantially as set forth and for the purposes specified.

4. In a device of the character described, a chain, a substantially triangular shaped link having a tapering opening therethrough, and a hook ring having its hooks engaging the larger end of said triangular shaped link whereby said hook ring and the chain to which it is attached are prevented from shifting relative to said link and said hook ring being adapted to be connected to said chain, substantially as set forth and for the purposes specified.

GEORGE F. ECKART.